Patented May 10, 1949

2,469,702

UNITED STATES PATENT OFFICE 2,469,702

PRODUCTION OF ALKYL HALIDES

Clare C. Schwegler and Frank M. Tennant, Midland, Mich., assignors to The Dow Chemical Company, Midland, Mich., a corporation of Delaware No Drawing. Application November 7, 1946, Serial No. 708,470

10 Claims. (Cl. 260—663)

This invention concerns an improved method for the production of alkyl halides from olefines and hydrogen halides.

It is known that alkyl halides may be formed by reacting hydrogen halides with mono-olefines and that the reaction may be catalyzed by metal halides such as aluminum chloride, aluminum bromide, ferric chloride, or ferric bromide, etc., or fluid complex catalysts comprising such metal halide chemically combined with a hydrogen halide and hydrocarbon. The catalysts are of the type commonly employed in Friedel-Crafts reactions and may be referred to as "Friedel-Crafts catalysts."

A usual procedure in carrying out such reaction is to pass an olefine and a hydrogen halide into a body of the complex catalyst, or preferably a mixture comprising a minor amount of such catalyst and a major amount of a non-reactive organic liquid medium, while maintaining the mixture at a temperature sufficient to distill the alkyl chloride therefrom at a rate corresponding approximately to that at which it is formed. The organic liquid preferably employed as a reaction medium is one having a boiling point at least as high as the desired reaction temperature. In some instances the alkyl halide formed by the reaction may be used as the medium, but in the production of a normally gaseous alkyl halide such as ethyl chloride a higher boiling saturated organic liquid is usually employed as a reaction medium so as to permit convenient operation at room temperature or above. A polyhalo-alkane such as ethylene chloride or propylene chloride is usually employed as the liquid medium, but other saturated organic liquids, e. g. ligroin, or kerosene, etc., can be used.

The reaction may be carried out in continuous manner over long periods of time by maintaining a pool of settled complex catalyst as a lower layer of the reaction liquor and gradually or periodically withdrawing portions of the settled catalyst while adding fresh catalyst to replace that which is withdrawn. Catalyst dissolved or suspended in the upper layer of the mixture, which is agitated due to introduction of the reactants, serves to cause rapid reaction between the hydrogen halide and the olefine. The rates of withdrawal of settled catalyst and introduction of fresh catalyst are controlled so as to maintain a high degree of catalytic activity, i. e. the catalyst is withdrawn as it decreases in activity due to use in the process. The process, as just described, is applied in the manufacture of ethyl chloride from ethylene and hydrogen chloride and may be applied in producing other alkyl halides, e. g. ethyl bromide from ethylene and hydrogen bromide, isopropyl chloride from propylene and hydrogen chloride, isopropyl bromide from propylene and hydrogen bromide, sec.-butyl chloride from a normal butylene and hydrogen chloride, or sec.-butyl bromide from a normal butylene and hydrogen bromide, etc. This invention is concerned particularly with the production of alkyl chlorides and bromides having from 2 to 4 carbon atoms in the molecule, but it may be applied in producing higher alkyl halides.

During production of an alkyl halide by the known method just described, foaming usually occurs and the degree of foaming becomes greater with increase in the rates of flow of the olefine and hydrogen halide starting materials to the reaction. The tendency toward foaming limits the rate of production in a given reaction system, since it is important that the rates of flow of the reactants be curtailed so as to avoid foaming of the mixture from the reaction vessel. Because of foaming of the reaction mixture, it has been necessary in the manufacture of ethyl chloride to feed ethylene and hydrogen chloride into a reaction mixture comprising aluminum chloride at rates far less than might otherwise be employed and still obtain substantially complete consumption of the ethylene. The curtailment in rate of production necessitated because of foaming results in an increase in cost of the product.

We have found that foaming of the aforementioned reaction mixtures may be restricted, or prevented, by adding a minor amount of sulphur either to the catalyst employed in the reaction or to the reaction mixture itself. The sulphur does not interfere appreciably with the action of the catalyst or the yield of alkyl halide. The action of sulphur in preventing, or reducing the amount of, foaming is not understood.

Usually, an amount of sulphur corresponding to from 1 to 2 per cent of the weight of the metal halide component of the catalyst is sufficient to restrict foaming of the mixture so as to permit introduction of the reactants as rapidly as they are consumed by the reaction. In some instances lesser amounts of sulphur, e. g. amounts corresponding to 0.1 per cent or less of the weight of the metal halide, are sufficient to prevent foaming to an objectionable extent. If desired, the sulphur may be employed in proportions far greater than those just mentioned. For instance, in producing ethyl chloride from ethylene and hydrogen chloride, we have added sulphur to the reaction mixture in proportions as great as 10 per cent of the weight of aluminum chloride in the catalyst without any deleterious effect. For purpose of economy, sulphur is usually employed in amount corresponding to less than 5, and preferably from 1 to 3, per cent of the weight of metal halide in the catalyst. In any instance, if foaming occurs to an objectionable extent, it may be curtailed by adding a minor amount of sulphur.

In manufacturing ethyl chloride in accordance with the invention, ethylene and hydrogen chloride are passed into a mixture comprising a suspension or solution of an aluminum chloride-containing catalyst and sulphur, in amount corresponding to from 0.5 to 10, and preferably from 1 to 3, per cent of the weight of the aluminum chloride, in a saturated organic liquid of suitable boiling temperature, e. g. a solution of ethyl chloride and a higher boiling compound such as ethylene chloride, or propylene chloride, etc. The reactants are usually introduced in approximately equimolecular proportions, preferably with the hydrogen chloride in slight excess over the ethylene, but a considerable excess of either reactant may be used. The mixture is maintained at a temperature sufficient to vaporize or distill ethyl chloride therefrom as it is formed. In this connection it may be mentioned that, even at temperatures higher than the boiling point of the ethyl chloride, a considerable amount of the latter remains dissolved in the reaction mixture, due apparently to the solvent action of the higher boiling liquid medium admixed with the catalyst. For instance, during such reaction at temperatures in the order of from 25° to 50° C. or higher the liquid reaction mixture comprises a large proportion of ethyl chloride, even though ethyl chloride alone boils at about 12° C. at atmospheric pressure. In general, the proportion of ethyl chloride retained in the liquid reaction mixture becomes less as the reaction temperature is raised. The reaction is usually carried out at room temperature or above, preferably at from 25° to 40° C., and at approximately atmospheric pressure, but it may be conducted at lower or higher temperatures or pressures.

The catalyst is employed in amount exceeding its solubility in the organic medium so that a portion of the catalyst settles as a lower layer or pool in a zone below the points of feed of reactants. In order to avoid a decrease in catalytic activity as the reaction is continued, portions of the settled catalyst are withdrawn from time to time and fresh aluminum chloride, or aluminum chloride-containing catalyst, is added, preferably in admixture with a minor amount of sulphur.

By operating as just described, the rates of introduction of the reactants, and consequently the rate of production in a given reaction system, may be increased considerably over that which may be employed in the absence of the sulphur without loss of material due to foaming. A similar advantage may be obtained in reacting hydrogen chloride or hydrogen bromide with an olefine containing from 2 to 4 carbon atoms in the presence of a Friedel-Crafts catalyst and a minor amount of sulphur.

It may be mentioned that an aluminum halide is preferred as a catalyst when reacting ethylene with a hydrogen halide and that a ferric halide is preferably employed in carrying out such reaction using the more readily reactive higher olefines such as propylene or butylene. Although aluminum chloride may be used in such reaction involving propylene or butylene, it usually causes considerable polymerization of these more reactive olefines. The ferric halide-containing catalysts have less tendency to cause polymerization than does aluminum chloride. It will be evident, of course, that in a reaction for the production of an alkyl chloride, a metal chloride, e. g. aluminum chloride or ferric chloride, is preferred as a catalyst and that a reaction for formation of an alkyl bromide is preferably carried out in the presence of a metal bromide catalyst.

The following example describes one way in which the principle of the invention has been applied, but is not to be construed as limiting the invention.

*Example*

Ethylene of about 88 per cent purity at a rate (expressed as at room temperature and atmospheric pressure) of 18,000 cubic feet per hour and hydrogen chloride of 88 per cent by volume concentration (the remainder being air) at a rate of 20,000 cubic feet per hour were passed into a lower section of a reaction tower filled to about two-thirds of its capacity with about 400 cubic feet of a liquid reaction mixture containing a major amount, i. e. 90 per cent by volume or more, of a solution of about 60 per cent by weight of ethyl chloride and 40 per cent of propylene chloride together with a minor amount of a fluid aluminum chloride-containing complex catalyst formed by reaction of aluminum chloride with ethylene and hydrogen chloride. The mixture also contained sulphur in amount corresponding to about 1.5 per cent of the weight of aluminum chloride in the catalyst. The reaction mixture was maintained at temperatures between 35° and 40° C., whereby ethyl chloride was vaporized from the mixture at approximately the rate at which it was formed. During the reaction, portions of the catalyst which settled as a layer at the bottom of the mixture were withdrawn from time to time and corresponding amounts of a mixture of aluminum chloride and about 1.5 per cent by weight of sulphur were fed into an upper section of the tower. Such replacements of catalyst were carried out as necessary in order to cause substantially complete consumption of the ethylene while maintaining the above rates of feed of ethylene and hydrogen chloride to the mixture. The vapors flowing from the reaction tower comprised ethyl chloride and minor amounts of hydrogen chloride and air, but were substantially free of ethylene. They were cooled to condense the ethyl chloride which was obtained in greater than 95 per cent yield. While some foaming occurred during the reaction, it did not take place to an extent such as to cause overflow of material from the reaction tower or any other operating difficulties.

When operating as just described, except for omitting sulphur from the reaction mixture, it has been necessary to limit the rates of feed of ethylene and hydrogen chloride to approximately 85 per cent of the above values in order to avoid foaming of the reaction mixture from the reaction tower. In other words, the use of sulphur to restrict the amount of foaming has rendered possible an approximately 15 per cent increase in the rate of production of ethyl chloride without change in the apparatus employed.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for the production of an alkyl halide wherein an olefine and a hydrogen halide are passed into a mixture of a catalyst containing a metal halide of the class consisting of aluminum chloride, aluminum bromide, ferric chloride and ferric bromide, and a non-reactive organic liquid of boiling point at least as high as that of the alkyl halide thus formed while vaporizing the resultant alkyl halide from the mixture, the improvement which consists in curtailing foaming during the reaction by adding a minor amount of sulphur to the reaction mixture.

2. A method which comprises passing an olefine having from 2 to 4 carbon atoms in the molecule and a hydrogen halide selected from the class consisting of hydrogen chloride and hydrogen bromide into a liquid mixture comprising the alkyl halide which is formed by reaction between the olefine and hydrogen halide, a catalyst containing a metal halide selected from the class consisting of aluminum chloride, aluminum bromide, ferric chloride and ferric bromide, and a minor amount of sulphur, while vaporizing the alkyl halide product from the reaction mixture.

3. A method, as described in claim 2, wherein portions of the catalyst are withdrawn from the reaction mixture and fresh catalyst and sulphur are added during the reaction.

4. A method, as described in claim 2, wherein the olefine and at least its molecular equivalent of the hydrogen halide are fed to the reaction at rates greater than may be employed in the absence of the sulphur without foaming of the reaction mixture from the reaction zone.

5. A method, as described in claim 2, wherein approximately equimolecular amounts of the olefine and the hydrogen halide are fed to the reaction at rates exceeding those that cause foaming of the mixture from the reaction zone when sulphur is omitted from the mixture and wherein portions of the catalyst are withdrawn from the reaction mixture and freseh catalyst and sulphur are added during the reaction.

6. A method which comprises passing an olefine having from 2 to 4 carbon atoms in the molecule and approximately its molecular equivalent of hydrogen chloride into a liquid mixture comprising the alkyl chloride which is formed by reaction between the olefine and hydrogen chloride, a catalyst containing a metal halide selected from the class consisting of aluminum chloride, aluminum bromide, ferric chloride and ferric bromide, and a minor amount of sulphur, while vaporizing the alkyl chloride product from the reaction mixture.

7. A method, as described in claim 6, wherein the olefine is ethylene and the catalyst comprises aluminum chloride.

8. A method, as described in claim 6, wherein the olefine is ethylene, the reaction mixture contains a saturated organic liquid medium having a boiling point higher than room temperature at atmospheric pressure, the catalyst comprises aluminum chloride, approximately equimolecular amounts of ethylene and hydrogen chloride are fed to the reaction at rates exceeding those that cause foaming of the mixture from the reaction zone when sulphur is omitted from the mixture, and wherein portions of the catalyst are withdrawn from the reaction mixture and fresh catalyst and sulphur are added during the reaction.

9. A method, as described in claim 6, wherein the olefine is propylene and the catalyst comprises ferric chloride.

10. A method, as described in claim 6, wherein the olefine is propylene and the catalyst comprises ferric chloride, approximately equimolecular amounts of propylene and hydrogen chloride are fed to the reaction at rates exceeding those that cause foaming of the reaction mixture from the reaction zone when sulphur is omitted from the mixture, and wherein portions of the catalyst are withdrawn from the reaction mixture and fresh catalyst and sulphur are added during the reaction.

CLARE C. SCHWEGLER.
FRANK M. TENNANT.

No references cited.